United States Patent
Nakazawa

(10) Patent No.: US 8,528,044 B2
(45) Date of Patent: Sep. 3, 2013

(54) INFORMATION PROCESSING APPARATUS AND CONTROL METHOD

(75) Inventor: Toshiyuki Nakazawa, Tokyo (JP)

(73) Assignee: Canon Kabushiki Kaisha (JP)

( * ) Notice: Subject to any disclaimer, the term of this patent is extended or adjusted under 35 U.S.C. 154(b) by 664 days.

(21) Appl. No.: 12/466,548

(22) Filed: May 15, 2009

(65) Prior Publication Data

US 2009/0288153 A1 Nov. 19, 2009

(30) Foreign Application Priority Data

May 15, 2008 (JP) .................................. 2008-128317

(51) Int. Cl.
*G06F 15/16* (2006.01)
*H04L 9/32* (2006.01)

(52) U.S. Cl.
USPC .................... 726/2; 726/6; 713/161; 713/170

(58) Field of Classification Search
USPC ................. 726/2, 6; 713/161, 170, 168, 169, 713/155
See application file for complete search history.

(56) References Cited

U.S. PATENT DOCUMENTS

| | | | | |
|---|---|---|---|---|
| 7,257,835 B2 * | 8/2007 | Jones | ................................. | 726/1 |
| 7,278,021 B2 * | 10/2007 | Shigeeda | ...................... | 713/182 |
| 7,421,731 B2 * | 9/2008 | Mitchell et al. | .................... | 726/3 |
| 7,546,630 B2 * | 6/2009 | Tabi | ................................... | 726/2 |
| 7,610,489 B2 * | 10/2009 | Maruyama et al. | ........... | 713/182 |
| 7,707,414 B2 * | 4/2010 | Nishio | ........................... | 713/168 |
| 7,765,580 B2 * | 7/2010 | Vandergeest et al. | .............. | 726/2 |
| 7,844,832 B2 * | 11/2010 | Nation et al. | ................... | 713/190 |
| 7,882,541 B2 * | 2/2011 | Yasaki et al. | ...................... | 726/2 |
| 7,921,456 B2 * | 4/2011 | Chua | ............................... | 726/10 |
| 7,979,054 B2 * | 7/2011 | Baysinger | ..................... | 455/411 |
| 8,087,062 B2 * | 12/2011 | Koeda | ................................ | 726/2 |
| 2003/0051208 A1 | 3/2003 | Todaka et al. | | |
| 2005/0131907 A1 | 6/2005 | Matsuzawa et al. | | |
| 2009/0007232 A1 * | 1/2009 | Kasatani | ........................... | 726/2 |

FOREIGN PATENT DOCUMENTS

| | | |
|---|---|---|
| JP | 2003-85178 A | 3/2003 |
| JP | 2005-174055 A | 6/2005 |
| JP | 2005-191777 A | 7/2005 |
| JP | 2007-081589 A | 3/2007 |

OTHER PUBLICATIONS

Japanese Office Action issued in counterpart application No. JP2008-128317, dated Oct. 9, 2012.

* cited by examiner

*Primary Examiner* — Krisna Lim
(74) *Attorney, Agent, or Firm* — Rossi, Kimms & McDowell LLP

(57) ABSTRACT

An information processing apparatus that can easily and safely transmit data. A registering unit registers first authentication information in association with user information indicating a first user. The first authentication information is necessary for the first user to log on to the information processing apparatus. A generating unit generates an address data that is used to transmit data from an external apparatus to the information processing apparatus and includes the user information and second authentication information. A transmitting unit transmits the address data to the external apparatus. An authenticating unit authenticates by utilizing the second authentication information included in the address data when the data is transmitted based on the address data from the external apparatus. A storing unit stores the received data in association with the first user when the authentication by the authenticating unit succeeds.

13 Claims, 17 Drawing Sheets

FIG.16A

| DELIVER ADDRESS BOOK | | | |
|---|---|---|---|
| SELECTION OF IMAGE READING APPARATUS TO WHICH ADDRESS BOOK IS DELIVERED | | | |
| IMAGE READING APPARATUS LIST | | | |
| IP ADDRESS | DEVICE NAME | STATUS | PRODUCT NAME |
| 192.168.0.10 | SALES 1 SECTION MONOCHROME | PRINTABLE | iR 2100 |
| 192.168.0.14 | SALES 1 SECTION COLOR | PRINTABLE | iR C5800 |
| 192.168.0.21 | SALES 2 SECTION MONOCHROME | ERROR | iR 2650 |
| 192.168.0.24 | SALES 2 SECTION A3 COLOR | PRINTABLE | iR C6800 |
| 192.168.0.55 | ACCOUNTING MFP | WARNING | iR C5600 |
| 192.168.0.230 | ADMINISTRATION HIGH SPEED MONOCHROME | PRINTABLE | iR 9500 |

802  803 [ NEXT > ]  [ CANCEL ] —804
—801

FIG.16B

| DELIVER ADDRESS BOOK | | |
|---|---|---|
| SELECTION OF USER REGISTERED TO ADDRESS BOOK | | |
| USER LIST | | |
| USER NAME | LOGIN NAME | E-MAIL |
| ■AOKI | 018273 | aoki.ichiro@foo.com |
| □AOYAMA | 038134 | aoyama.jiro@foo.com |
| □AKASAKA | 019273 | akasaka.hanako@foo.com |
| □IGAWA | 012845 | igawa.keiko@foo.com |
| ■ITOU | 028973 | itou.shunsuke@foo.com |
| □UKITA | 028361 | ukita.utako@foo.com |

806  807 [ < BACK ]  [ DELIVER ]  [ CANCEL ] —808
—809
—805

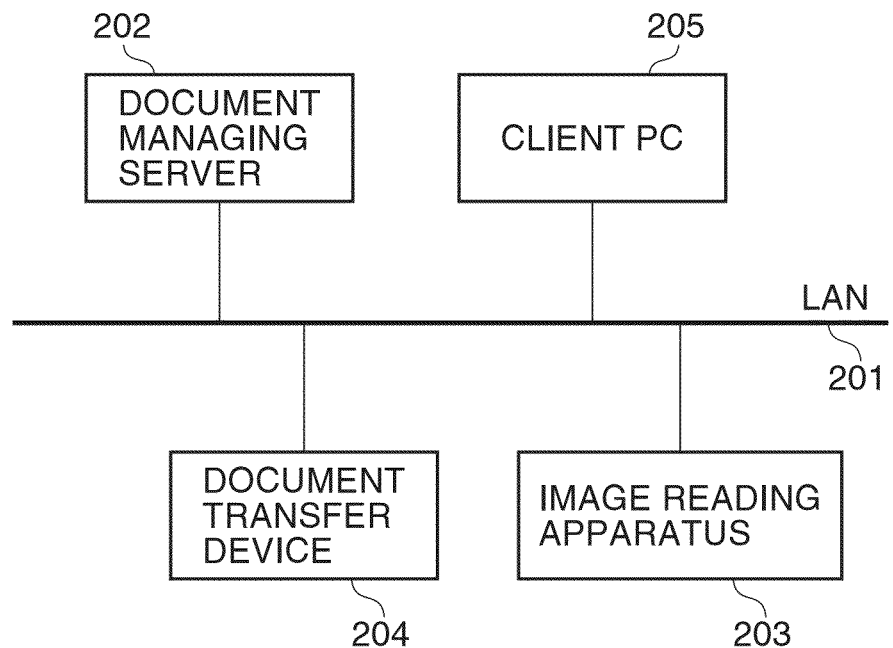

INFORMATION PROCESSING APPARATUS AND CONTROL METHOD

BACKGROUND OF THE INVENTION

1. Field of the Invention

The present invention relates to an information processing apparatus for managing data in association with a user, and a control method of the information processing apparatus.

2. Description of the Related Art

Conventionally, a document managing system has been known, as a data managing system, in which image data generated by reading an original document with a network apparatus and transmitted from the network apparatus is stored as a document. FIG. 17 is a diagram showing a configuration of the conventional document managing system. The document managing system is provided with a document managing server 202, a document transfer device 204, an image reading apparatus 203, and a client PC 205 which are connected through a LAN 201 (for example, Japanese Laid-Open Patent Publication (Kokai) No. 2003-085178).

The image data read by the image reading apparatus 203 is temporally transmitted to the document transfer device 204 by using a file transfer protocol such as FTP. The document transfer device 204 transmits the image data received from the image reading apparatus 203 to the document managing server 202 according to the user settings. A unique protocol is often used to transfer a document from the document transfer device 204 to the document managing server 202.

The document managing server 202 stores and manages the data received from the document transfer device 204 in association with the user. The document stored and managed on the document managing server 202 can be manipulated with document managing client software running on the client PC 205. In recent years, the progress in the WEB technology has led to the increasing emergence of a system provided with a function for manipulating the document managing server 202 with a WEB browser running on the client PC 205.

There also exists a document managing system which directly transmits the image data read by the image reading apparatus 203 to the document managing server 202 (for example, Japanese Laid-Open Patent Publication (Kokai) No. 2005-174055). In this case, a unique protocol or a general-purpose file transfer protocol such as the FTP is used to transfer the image data. In such a case, to manage the received image data in association with the user in the document managing server 202, user authentication information for accessing the document managing server 202 is generally used as authentication information for transferring the image data.

However, the above conventional document managing systems have the following disadvantages. In case of a document managing system that requires the document transfer device, the document transfer device must be installed, and settings must be made for transferring the image data transmitted from the image reading apparatus to the document managing server in association with the user of the document managing server. These place a burden on an administrator.

In addition, while the document managing server is a final storing destination for the read image data, the read image data will first be transmitted to the document transfer device when the image reading apparatus is operated. Therefore, there is a problem that the storing destination and a transfer destination of the image are different from each other.

Further, the document transfer device needs to keep the authentication information for connecting to the document managing server. Thus, managing authentication information in a plurality of locations may increase the possibility of leaking the information, so that this is unfavorable for security.

When the unique protocol is used to transfer the read image data in a document managing system which does not need the document transfer device, it is necessary to provide the image reading apparatus with such a protocol. This means that when the general-purpose protocol is used to transfer the image data and such a general-purpose protocol is not secure, user authentication information for accessing the document managing server may be leaked to a third party on the network.

On the other hand, when a secure general-purpose protocol is used, it becomes necessary to provide a security infrastructure such as PKI (Public Key Infrastructure) and to make settings for it. These place a burden on an implementer and an administrator. When the authentication information is stored in a storage device in the image reading apparatus to simplify the transmission of the read image data, the authentication information of the document managing server may be leaked if it is not appropriately stored for safekeeping.

For security measures, a password for the authentication information in the document managing server is often stored in the form of a one-way hash of the password such as SHA-1 and MD5. In this case, the one-way hash is calculated for the password inputted by the user, and when the calculated results are matched, the authentication to the document managing server succeeds. In such a system, when setting the authentication information to the document managing server to be stored in the document transfer device and the image reading apparatus, the user needs to input the authentication information to the document managing server. This places a burden on an administrator and the user.

SUMMARY OF THE INVENTION

The present invention provides an information processing apparatus which can easily and safely transmit data from a device to the information processing apparatus, and the control method of the information processing apparatus.

Accordingly, in a first aspect of the present invention, there is provided an information processing apparatus capable of storing data in association with a user comprising a registering unit that registers first authentication information in association with user information indicating a first user, the first authentication information being necessary for the first user to log on to the information processing apparatus, a generating unit that generates an address data, the address data being used to transmit data from an external apparatus to the information processing apparatus, and including the user information and second authentication information, a transmitting unit that transmits the address data to the external apparatus, an authenticating unit that authenticates by utilizing the second authentication information included in the address data when the data is transmitted based on the address data from the external apparatus and a storing unit that stores the received data in association with the first user when the authentication by the authenticating unit succeeds.

In a second aspect of the present invention, there is provided a control method of an information processing apparatus capable of storing data in association with a user comprising a registration step of registering first authentication information in association with user information indicating a first user, the first authentication information being necessary for the first user to log on to the information processing apparatus, a generation step of generating an address data, the address data being used to transmit data from an external apparatus to the information processing apparatus, and including the user information and second authentication information, a transmitting step of transmitting the address data to the external apparatus, an authentication step of authenticating by utilizing the second authentication information included in the address data when the data is transmitted based on the address data from the external apparatus and a storing step of storing the received data in association with the first user when the authentication in said authentication step succeeds.

The features and advantages of the invention will become more apparent from the following detailed description taken in conjunction with the accompanying drawings.

BRIEF DESCRIPTION OF THE DRAWINGS

FIG. 16A is a diagram showing a UI operation screen of an address book automatic generating process in the document managing system according to a third embodiment of the present invention.

FIG. 16B is a diagram showing the a user selection screen of the address book automatic generating process in the document managing system according to the third embodiment of the present invention.

FIG. 17 is a diagram showing a configuration of the conventional document managing system.

DETAILED DESCRIPTION OF THE PREFERRED EMBODIMENTS

The present invention will now be described in detail below with reference to the accompanying drawings showing preferred embodiments thereof.

[First Embodiment]

Figure 1:
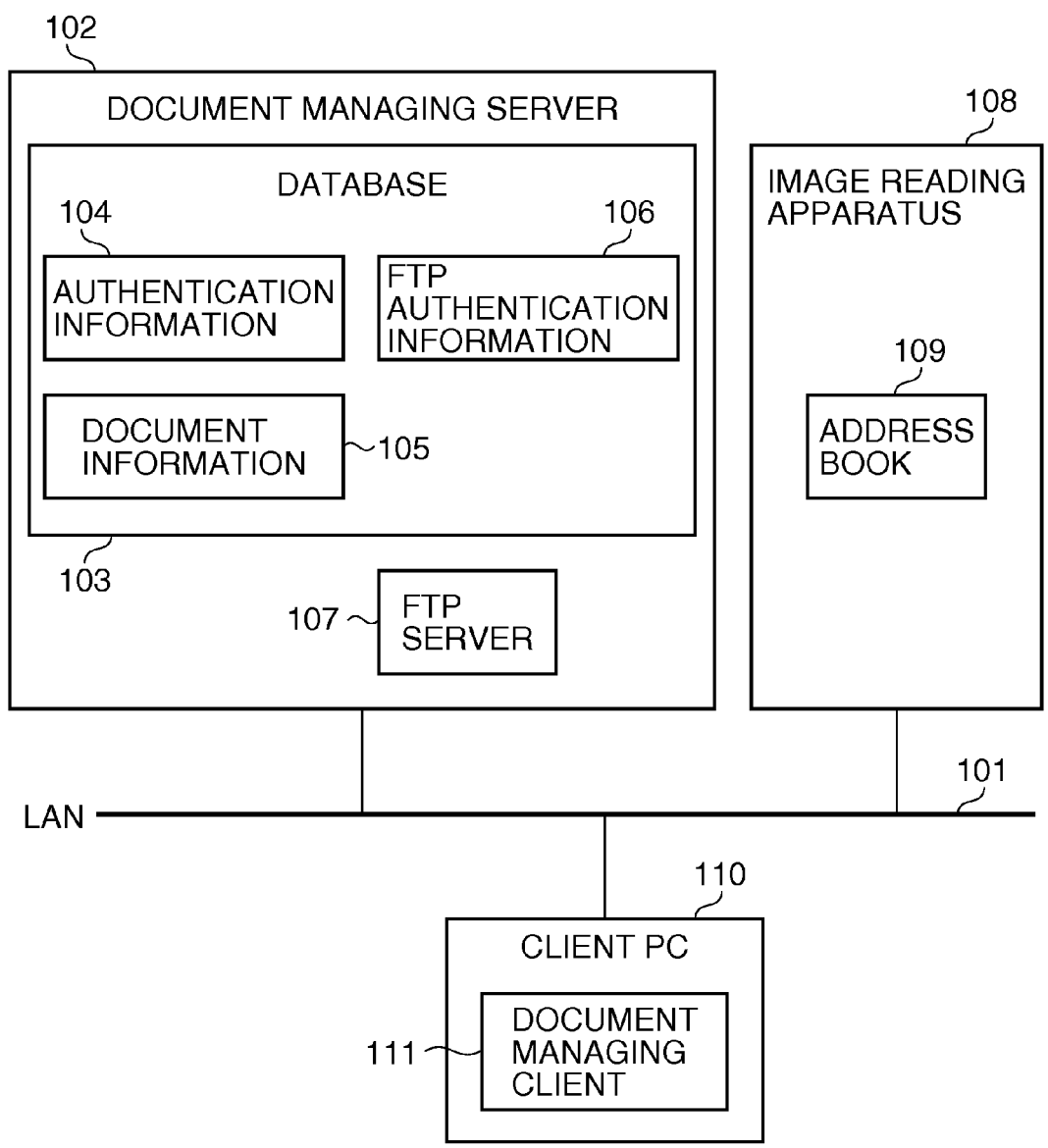
FIG. 1 is a block diagram showing a configuration of a document managing system according to a first embodiment of the present invention.

FIG. 1 is a block diagram showing a configuration of a document managing system according to a first embodiment. The document managing system is provided with a document managing server 102, an image reading apparatus 108, and a client PC 110. These are connected to each other through a local area network (LAN) 101, which is a type of a communication network. The image reading apparatus 108 reads image data and transmits the image data to the document managing server 102. The client PC 110 logs on the document managing server 102 to handle documents stored in the document managing server 102. The document managing server 102, the image reading apparatus 108 and the client PC 110 transmit and receive data through the LAN 101.

The document managing server 102 incorporates a database 103. In the present embodiment, the database 103 resides in the document managing server 102. However, the database 103 may reside in another PC (database server) connected to the LAN 101. The following information is registered in the database 103: authentication information 104 used when the client PC 110, or the like logs on to the document managing server 102; document information 105 in which information such as an access right on a stored document is recorded; and FTP authentication information 106.

The document managing server 102 incorporates an FTP server 107 for receiving the image data transmitted from the image reading apparatus 108. While it is assumed that FTP is used as a file receiving protocol in the present embodiment, the file receiving protocol is not limited to the FTP, and a general-purpose file transfer protocol such as WebDAV and SMB can also be utilized. In the present embodiment, the general-purpose file transfer protocol provides an authenticating function and a receiving function for receiving a document. The FTP server 107 uses the FTP authentication information 106 in the database 103 when user authentication is executed.

The image reading apparatus 108 has a function for transmitting the read image data to the document managing server 102 through the LAN 101. A digital multi-functions and a network scanner are, for example, used as the image reading apparatus 108. The image reading apparatus 108 incorporates an address book 109, and transmits the read image data by using a protocol, a host name and the authentication information which are described in the address book 109. The image reading apparatus 108 also has a function for storing a list of a transmission address delivered from the document managing server 102 on the LAN 101 as the address book 109, and a function for storing and additional transmission address to the address book 109.

The client PC 110 incorporates a document managing client 111. The document managing client 111 operates on the client PC 110, connects to the document managing server 102, and handles the document associated with an authenticated user.

Figure 2:
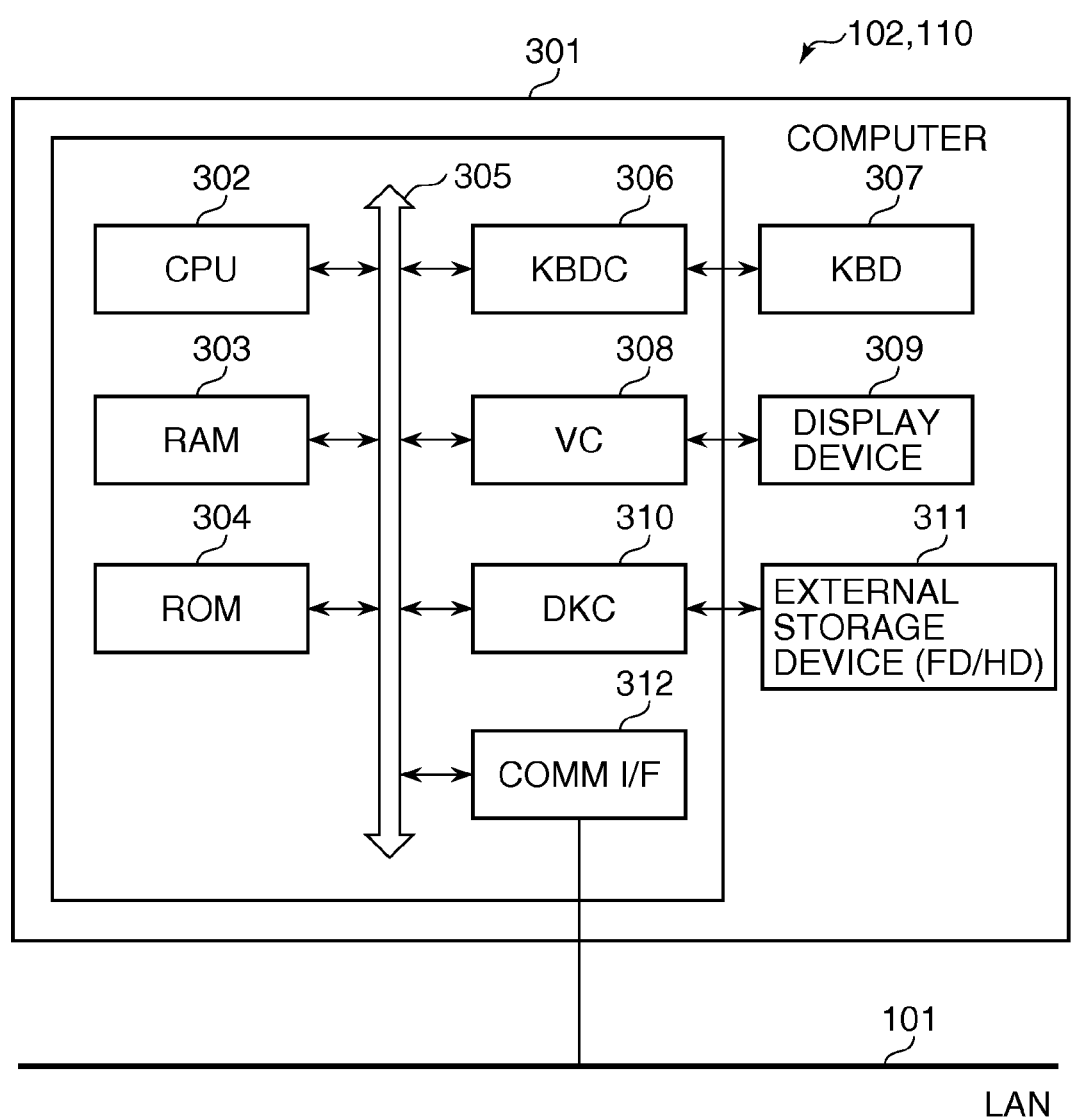
FIG. 2 is a block diagram showing a hardware configuration of a host computer functioning as a document managing server and a client PC.

FIG. 2 is a block diagram showing a hardware configuration of a host computer functioning as the document managing server and the client PC. A host computer 301 is provided with a CPU 302, a RAM 303, a ROM 304, and an external storage device 311. The CPU 302 executes software stored in the ROM 304 or the external storage device 311, and totally controls each device connected to a system bus 305. The RAM 303 functions as a main memory, a work area or the like for the CPU 302. The external storage device 311 is comprised of a hard disk (HD), a floppy (registered trademark) disk (FD), or the like. The external storage device 311 stores a boot program, an operating system, a variety of applications including an authenticating server and an authentication client, a database data, font data, a user file, and the like.

The host computer 301 is provided with a keyboard controller (KBDC) 306 connected to the system bus 305. The keyboard controller 306 transmits input information from a keyboard (KBD) 307 and a pointing device (not-illustrated) to the CPU 302.

The host computer 301 is provided with a video controller (VC) 308 connected to the system bus 305. The video controller 308 controls a display device 309 such as a CRT and an LCD for display operation.

The host computer 301 is provided with a disk controller (DKC) 310 connected to the system bus 305. The disk controller 310 controls an access to the external storage device 311.

The host computer 301 is provided with a communication controller (COMM I/F) 312 connected to the system bus 305, and is connected to the LAN 101 through the communication controller 312.

Figure 3:
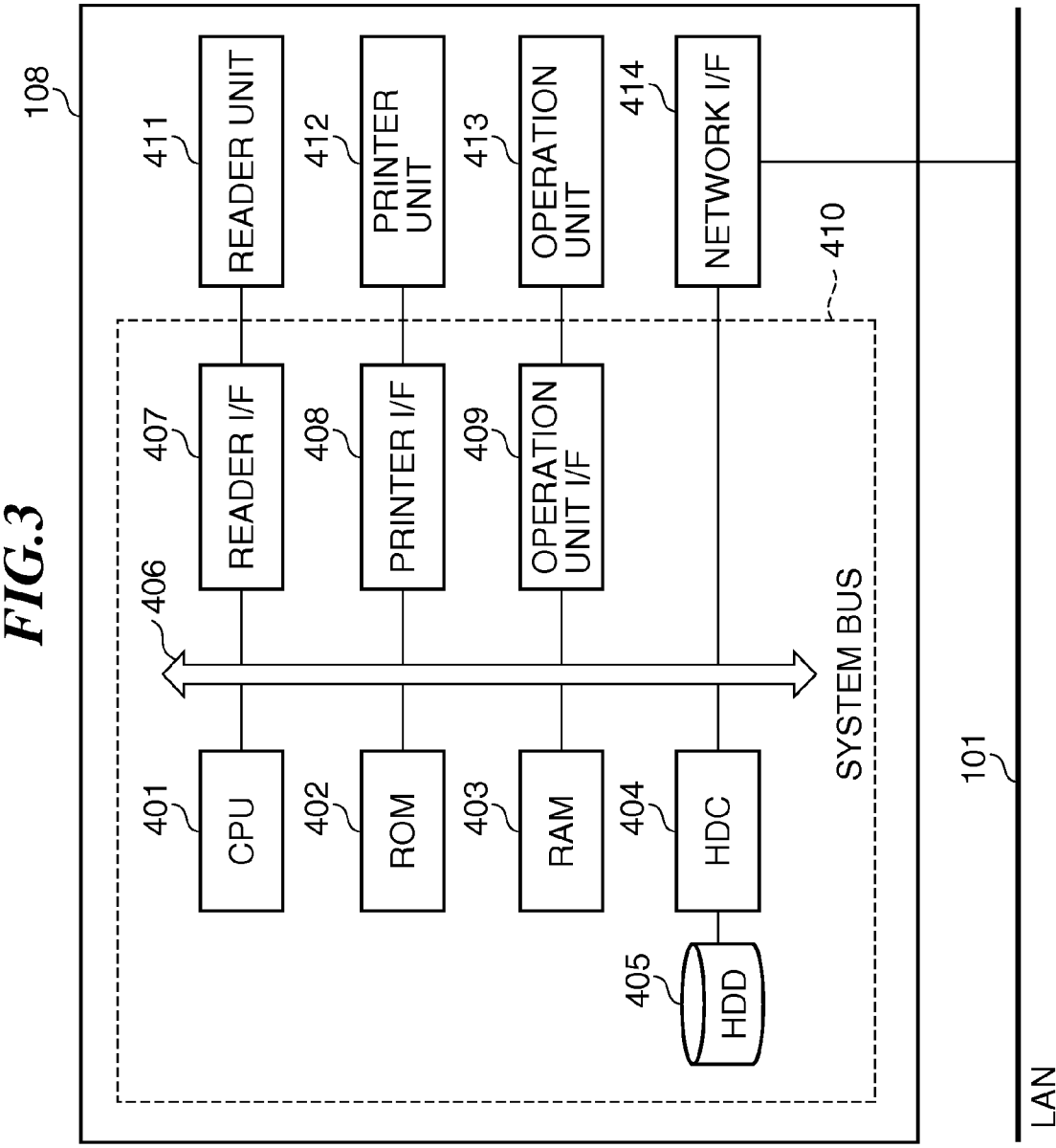
FIG. 3 is a block diagram showing a configuration of a digital multi-functions functioning as an image reading apparatus.

FIG. 3 is a block diagram showing a configuration of the digital multi-functions functioning as the image reading apparatus 108. The image reading apparatus 108 is provided with a total control unit 410, a reader unit 411, a printer unit 412, an operation unit 413, and a network I/F 414. Here, the total control unit 410 controls a variety of apparatuses connected to the digital multi-functions and an interface, and controls an operation of the whole digital multi-functions.

The total control unit 410 is provided with a CPU 401, a ROM 402, a RAM 403, a hard disk controller (HDC) 404, a reader I/F 407, a printer I/F 408, and an operation unit I/F 409. These are connected to each other through a system bus 406. A hard disk (HDD) 405 as a storage device is connected to the hard disk controller (HDC) 404.

The CPU 401 executes software stored in the ROM 402 or the hard disk (HDD) 405 to totally control each device connected to the system bus 406, and to control the whole digital multi-functions. The RAM 403 functions as a work area of the CPU 401, or the like. The hard disk controller (HDC) 404 controls the hard disk (HDD) 405. The reader I/F 407 and the printer I/F 408 are connected to the reader unit 411 and the printer unit 412 respectively, and control units corresponding to each I/F.

The operation unit 413 is provided with a button (switch) for the operation, a touch panel input liquid crystal display screen, a display device that displays the operational status of the digital multi-functions, and the like. The operation unit 413 displays information from the total control unit 410 to the user, and notifies the total control unit 410 of input information by the user. The operation unit I/F 409 is connected to the operation unit 413, and controls a display to the operation unit 413 and a user input from the operation unit 413. The network I/F 414 communicates data with the host computer 301 through the LAN 101.

The reader unit 411 reads an image of an original document, then outputs image data corresponding to the image of the original document to the printer unit 412 and stores the image data in the hard disk (HDD) 405 in the digital multi-functions according to an instruction from the user. The image data read by the reader unit 411 can also be transmitted to the host computer 301 connected to the LAN 101 through the network I/F 414.

The printer unit 412 prints the image data of the original read by the reader unit 411, and the image data stored in the hard disk (HDD) 405 disposed in the digital multi-functions. The printer unit 412 receives print data from the host computer 301 connected to the LAN 101 through the network I/F 414, and prints the received print data.

The network I/F 414 is connected to the LAN 101, and is used so that the total control unit 410 can mutually communicates with another information device (information processing apparatus) connected to the LAN 101, such as the document managing server 102 and the client PC 110.

Figure 4:
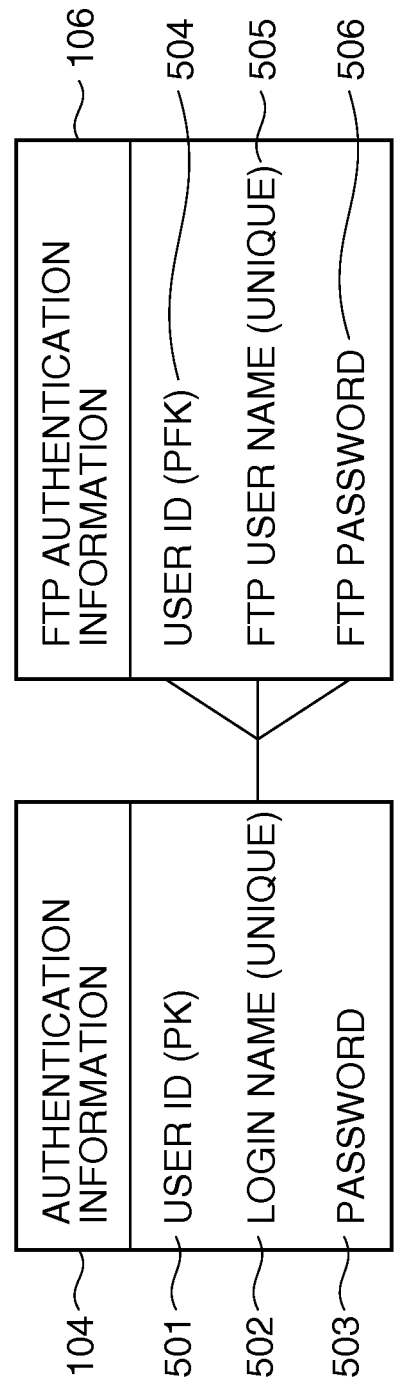
FIG. 4 is an ER diagram showing relation between authentication information and FTP authentication information in a database incorporated in the document managing server.

FIG. 4 is an ER diagram (Entity-Relationship Diagram) showing relation between authentication information and FTP authentication information in the database incorporated in the document managing server.

The authentication information 104 includes at least a user ID 501 for uniquely identifying the user, a login name 502, and a password 503. The login name 502 and the password 503 are, for example, used when the client PC 110 logs on to the document managing server 102 by using the document managing client 111. Thus, the login name 502 must be unique. The password 503 may be leaked from the database if it is stored in plain text. Thus, in view of security, the one-way hash (SHA-1, MD5, and the like) of the password may be stored as the password 503.

The document managing server 102 permits the connection only when a connection request is issued by the client PC 110 with a correct combination of the login name and the password. Thus, the user can manipulate the document and a folder associated with the user himself. Additional information such as the user name, an e-mail address of the user, and the like may be added to the authentication information 104.

The FTP authentication information 106 includes a user ID 504, an FTP user name 505, and an FTP password 506 for identifying the user of the image reading apparatus 108. The FTP authentication information 106 is automatically generated by the document managing server 102, and is stored in the external storage device 311. The FTP authentication information 106 is used when the user of the FTP server 107 is authenticated. The FTP user name 505 must be unique. When receiving a file such as the image data, the FTP server 107 authenticates the user by using the FTP user name 505 and the FTP password 506 described in the FTP authentication information 106. When such pieces of information are matched, the FTP server 107 permits the connection, and receives the file. In this case, since the FTP authentication information 106 includes the user ID 501 of the document managing server 102 as an external key, the user ID 501 of the document managing server 102 can be specified from the FTP user name 505 through this external key.

Figure 5:
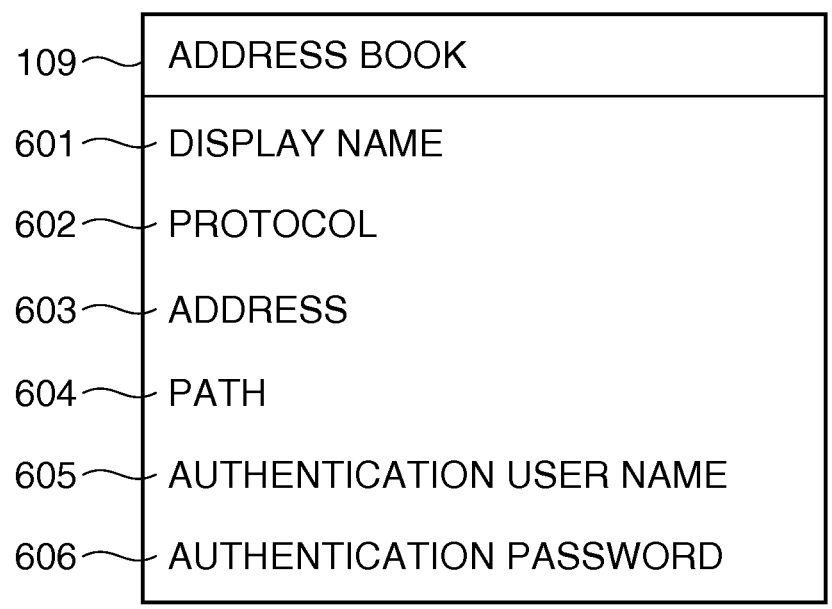
FIG. 5 is a diagram showing contents of an address book which is automatically generated by the document managing server, and is delivered to the image reading apparatus.

FIG. 5 is a diagram showing contents of the address book held in the image reading apparatus. The address book 109 is periodically and automatically generated by the document managing server 102 and delivered to the image reading apparatus 108. A display name 601 is a character string used when a destination is displayed on the operation unit 413 of the image reading apparatus 108. For example, the login name 502 to the document managing server 102 is used as the display name 601. When the authentication information 104 in the document managing server 102 keeps the user name related to login name, such a user name can also be used as the display name 601.

A protocol 602, an address 603, and a path 604 refer to a file transfer protocol, a network address of a transfer destination, and a path of a storing destination of the file, respectively, which are used when the image data is transferred. In the present embodiment, the protocol 602 is the FTP, the address 603 is the network address of the document managing server 102, and the path 604 is a blank.

An authentication user name 605 and an authentication password 606 are the user name and the password, respectively, which are used for the authentication when the file is transferred. In the present embodiment, the authentication user name 605 and the authentication password 606 are the same as the FTP user name 505 and the FTP password 506 of the FTP authentication information 106 respectively.

Figure 6A:
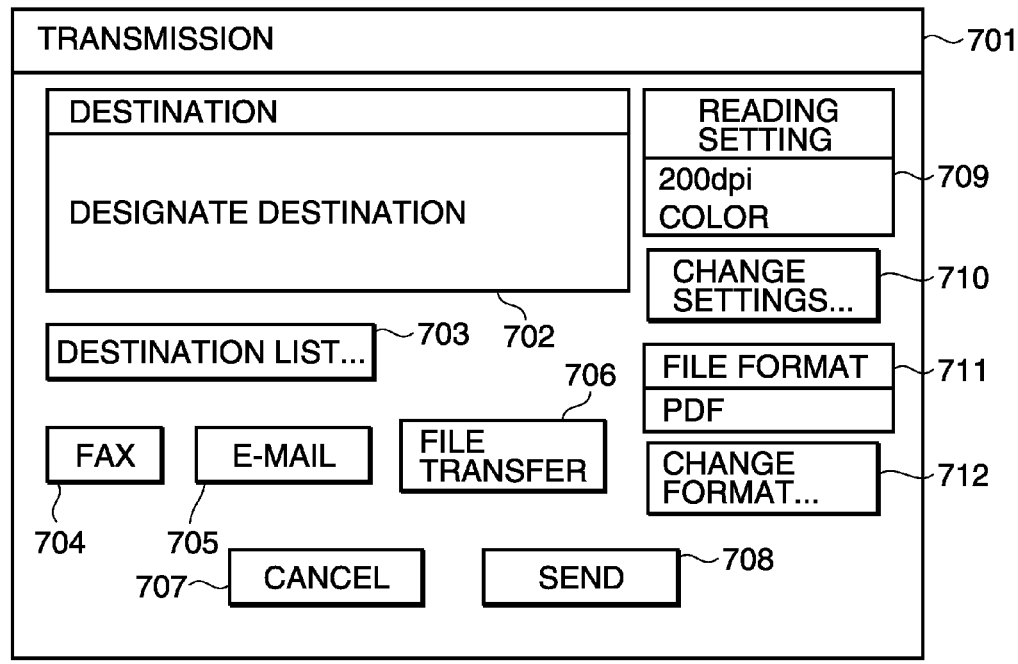
FIG. 6A is a diagram showing a transmission operation screen displayed on an operation unit of the image reading apparatus for transmitting a read image.

FIG. 6A is a diagram showing a transmission operation screen displayed on the operation unit of the image reading apparatus for transmitting a read image. In FIG. 6A, a transmission operation screen 701 is a screen for reading and transmitting the image. A list indicating a transmission destination used when transmitting the read image is displayed in a destination list 702. In an example of FIG. 6A, a destination is not yet designated. When the destination is selected from the address book 109, a destination list button 703 is pressed, and a target destination is selected from the displayed destination list. A detail of this operation will be described later. On the other hand, when the destination is manually inputted, a FAX button 704, an e-mail button 705, or a file transfer button 706 is pressed according to a type of the destination, and the target destination is inputted to be added to the destination list 702.

The setting for reading the image is displayed in a read setting 709. The setting for reading the image can be changed from the screen displayed by pressing a change settings button 710. The setting for reading the image includes the setting for monochrome or color, the setting for photograph or text, the setting for resolution of the reading, and the like.

A file format of the image data used for the transmission is displayed in a file format 711. The file format can be changed from the screen displayed by pressing a change format button 712. The file format includes PDF, TIFF, JPG, and the like. When the user presses a send button 708, the image data read by the setting displayed in the read setting 709 is transmitted in the file format displayed in the file format 711 to the destination displayed in the destination list 702. When a cancel button 707 is pressed, the transmission operation screen 701 is closed.

Figure 6B:
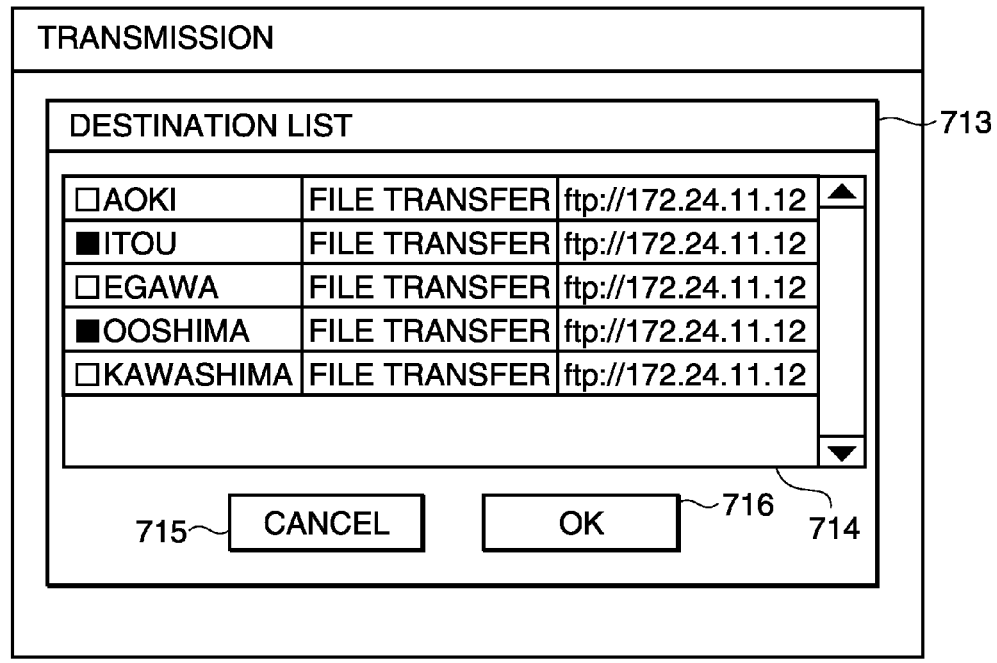
FIG. 6B is a diagram showing a destination selection screen displayed on the operation unit when a destination list button shown in FIG. 6A is pressed.

FIG. 6B is a diagram showing a destination selection screen displayed on the operation unit when the destination list button is pressed. A destination selection screen 713 is displayed when the destination list button 703 of the transmission operation screen 701 is pressed. A list of the address stored in the address book 109 is displayed in a destination selection list 714. The user selects a target destination from this list. In the present embodiment, the two destinations of "Itou" and "Ohshima" are selected. By pressing an OK button 716, the destination selection screen 713 is closed, the screen returns to the transmission operation screen 701, and the destination selected by the destination selection list 714 is inserted to the destination list 702. On the other hand, when a cancel button 715 is pressed, the destination selection screen 713 is closed with nothing executed, and the transmission operation screen 701 is displayed.

Figure 7:
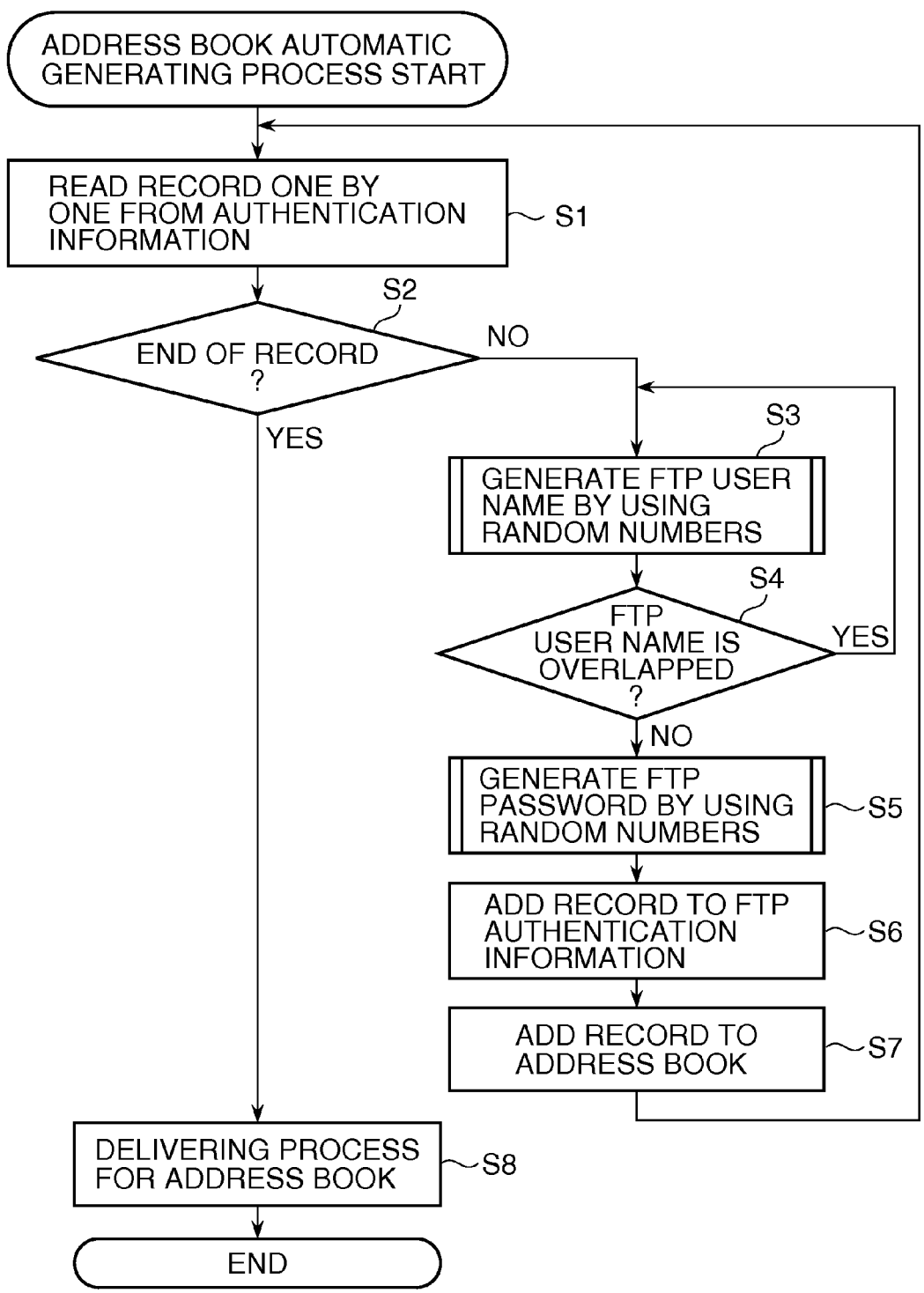
FIG. 7 is a flowchart showing a procedure when the FTP authentication information and the address book are automatically generated from the authentication information.

FIG. 7 is a flowchart showing a procedure when the FTP authentication information and the address book are automatically generated from the authentication information. The program for processing this procedure is stored in the external storage device 311 in the host computer 301 functioning as the document managing server 102, and is read to be executed by the CPU 302.

When an address book automatic generating process is started, the CPU 302 in the document managing server 102 reads the authentication information record by record from the authentication information 104 stored in the external storage device 311 (step S1). The CPU 302 in the document managing server 102 determines whether or not the record to be read exists, that is, whether or not it is an end of the record (step S2).

When the record to be read does not exist, that is, the process for all of the records is completed, the CPU 302 in the document managing server 102 executes the process for delivering the generated address book 109 to the image reading apparatus 108 (step S8), and completes the present process.

On the other hand, when it succeeds in step S2 to read the record, the CPU 302 in the document managing server 102 generates the FTP user name 505 by using random numbers (step S3). As described above, since the FTP user name 505 needs to be unique in the FTP authentication information 106, the CPU 302 in the document managing server 102 checks whether or not the FTP user name 505 generated in step S3 exists in the FTP authentication information 106 (step S4).

As a result of the checking, when the generated FTP user name 505 previously exists in the FTP authentication information 106, the CPU 302 in the document managing server 102 makes the process return to step S3 to repeat the same process, and generates the unique FTP user name 505.

On the other hand, when it is confirmed in step S4 that the unique FTP user name 505 which does not exist in the FTP authentication information 106 is generated in step S3, the CPU 302 in the document managing server 102 generates the FTP password 506 by using the random numbers (step S5). It should be noted that the FTP password 506 must be unique.

Since the FTP authentication information 106 and the address book 109 are ready for accepting records in step S5, the CPU 302 in the document managing server 102 then adds the record to the FTP authentication information 106 (step S6), and adds the record to the address book 109 (step S7). In the present embodiment, the record added to the FTP authentication information 106 is a set of the user ID 504, the FTP user name 505, and the FTP password 506. On the other hand, the record added to the address book 109 is a set of the user name (the display name 601), the FTP protocol (the protocol 602), the address (the address 603) of the document managing server 102, a blank (the path 604), the FTP user name (the authentication user name 605), and the FTP password (the authentication password 606). In this case, since it is assumed that the authentication information 104 includes the user name related to the login name, the user name is used. As apparent from the above description, the FTP user name and the FTP password to be added to the address book 109 are the same as the FTP user name 505 and the FTP password 506 respectively.

Since the process for one record of the authentication information 104 is completed in step S7, the CPU 302 in the document managing server 102 makes the process return to step S1, and continues to read the next record. Since the delivering operation processed in step S8 for the address book 109 to the image reading apparatus 108 is not directly related to the present invention, the detailed description will be omitted. For example, it is conceivable to use a method in which contents of the address book 109 are formatted in XML, and delivered to the image reading apparatus 108 by using a WEB service. A secure delivering method is desired since the address book 109 includes confidential information such as the authentication information when the file is transferred.

Figure 8:
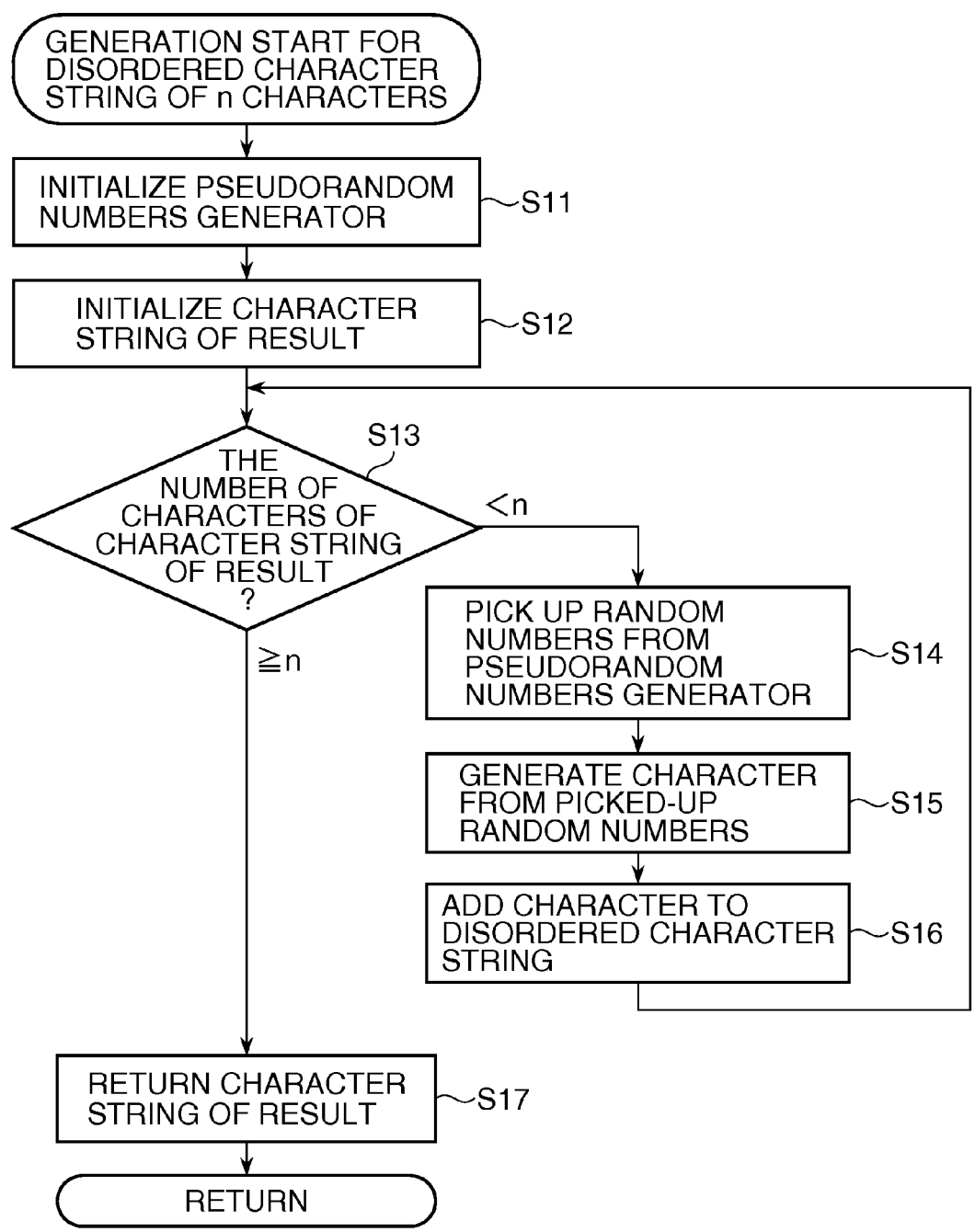
FIG. 8 is a flowchart showing a character string generating procedure for generating a user name and a password from random numbers in steps S3 and S5 in FIG. 7.

FIG. 8 is a flowchart showing a character string generating procedure for generating the user name and the password from the random numbers generated in steps S3 and S5. In this character string generating procedure, the number (n) of characters of a character string to be generated is given as a parameter from a caller side.

The CPU 302 in the document managing server 102 first initializes a pseudorandom number generator (step S11). The pseudorandom number generator is often provided in an OS or a library. For example, the pseudorandom number generator corresponds to functions in a standard library of the C language such as srand (for initialization of the pseudorandom number generator) and rand (for generation of the pseudorandom number) In some OS or library, the pseudorandom number generator with a higher level of security is provided.

The CPU 302 in the document managing server 102 initializes a character string used for storing a result to empty the character string (step S12). The CPU 302 in the document managing server 102 checks the number of characters in the character string used for storing the result, and determines whether or not the number of characters reaches a value "n" (step S13).

When the number of characters reaches the value "n", the CPU 302 in the document managing server 102 calls the resultant character string (the character string of the number of characters "n") and returns the character string to the original process (step S17). Then, the present process is terminated and the process returns to the original process. On the other hand, when the number of characters does not reach the value "n" in step S13, the CPU 302 in the document managing server 102 picks up random numbers from the pseudorandom number generator (rand function of the C language, and the like) (step S14).

The CPU 302 in the document managing server 102 generates the character from the random numbers picked-up from the pseudorandom number generator (step S15). For example, it is assumed that the pseudorandom number generator returns integers from a value "0" to a value "RAND_MAX", and a character code of characters valid for the character string has a numerical value from a value "32" to a value "126". In this case, a character having a character code [32+(126−32)×X/RAND_MAX] is determined, where "X" is the picked-up random number. The CPU 302 in the document managing server 102 adds the generated character to the character string used for storing the result (step S16), and makes the process return to step S13. The CPU 302 in the document managing server 102 repeats the process from step S14 to step S16 until the character string whose number of characters is "n" is generated.

Figure 9:
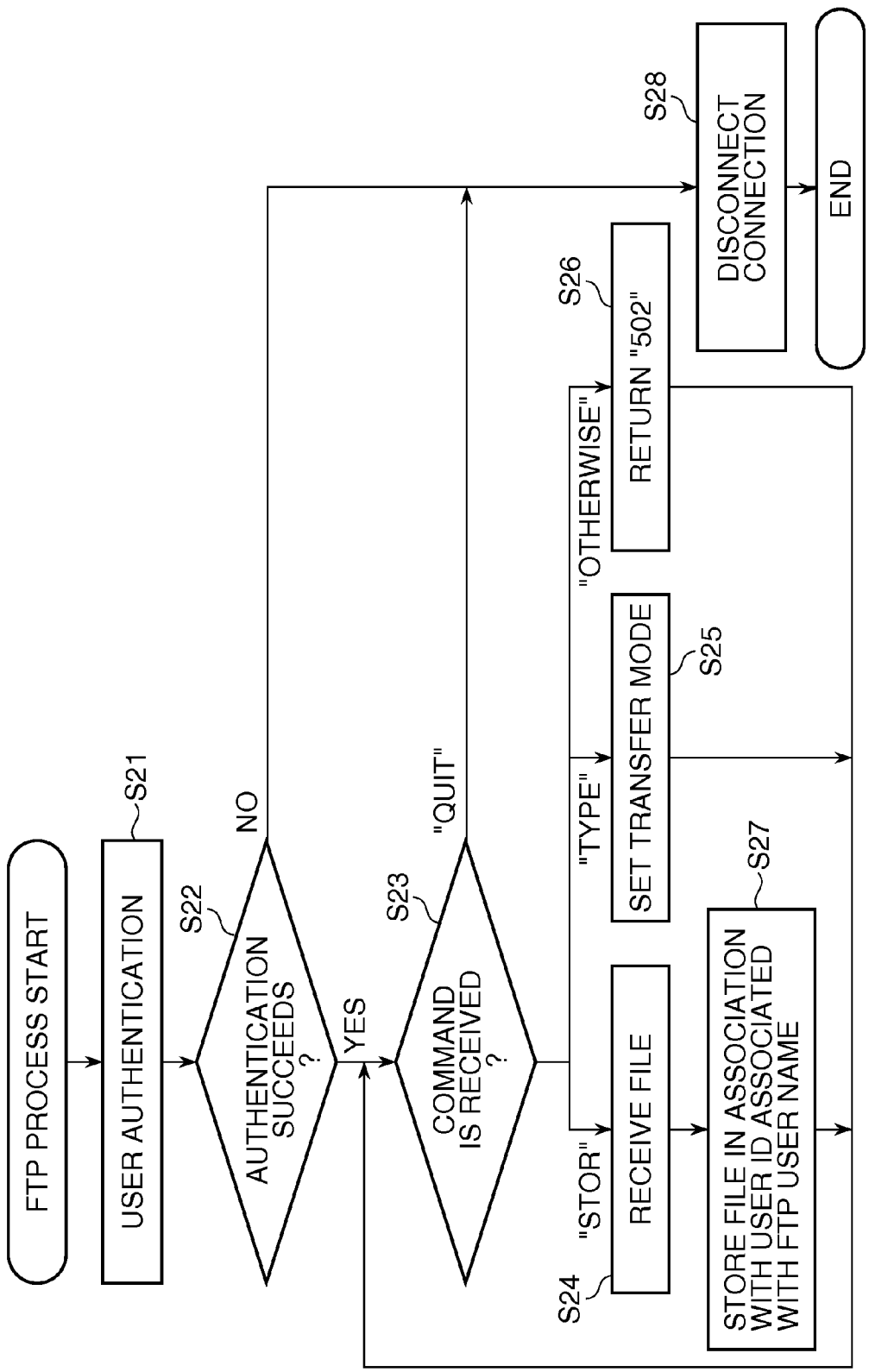
FIG. 9 is a flowchart showing a receiving procedure by an FTP server.

FIG. 9 is a flowchart showing a receiving procedure by the FTP server. The program for processing this procedure is stored in the external storage device 311 in the host computer 301 functioning as the FTP server 107 in the document managing server 102, and is read to be executed by the CPU 302.

The FTP server 107 normally is in a connection waiting state. When the image reading apparatus 108 on the network issues the connection request, the FTP server 107 starts another thread and process, and commits the subsequent processes to the thread and process. FIG. 9 shows the process of this thread and process. Thus, at the time when the receiving process is started, the connection between the image reading apparatus 108 issuing the connection request and the FTP server 107 has been already completed.

When the connection is established between the FTP server 107 and the image reading apparatus 108, the FTP server 107 first executes the user authentication (step S21). That is, the FTP server 107 receives the FTP user name (the authentication user name 605) and the FTP password (the authentication password 606) from the image reading apparatus 108, and checks a combination of the FTP user name and the FTP password with the FTP authentication information 106. The FTP server 107 determines whether or not the checking succeeds (step S22).

As a result of the checking, when the combination of the FTP user name and the FTP password transmitted by the image reading apparatus 108 is found in the FTP authentication information 106, the FTP server 107 determines that the authentication succeeds. On the other hand, as a result of the checking, when the authentication fails, the FTP server 107 disconnects the connection with the image reading apparatus 108 (step S28), and completes the present process.

When determining that the authentication succeeds, the FTP server 107 continuously receives commands from the image reading apparatus 108 (step S23), and executes the process according to the commands. When a "QUIT" command indicating completion of the process is received, the FTP server 107 disconnects the connection with the image reading apparatus 108 in step S28, and completes the present process.

When a "STOR" command which indicates a reception of a file transmitted from the image reading apparatus 108 is received, the FTP server 107 receives the file (step S24). Here, the process for receiving the file in step S24 is one example of the process executed by a first receiving unit. The FTP server 107 associates the received file with the user ID 504 stored in the FTP authentication information 106 in association with the FTP user name 505 used for the authentication, and stores the received file in the document managing server 102 (step S27). That is, the received file is stored in the external storage device 311. After that, the process by the FTP server 107 returns to step S23.

When a "TYPE" command which specifies a type (transfer mode) of the file used for file transfer is received, and when the file is transferred, the FTP server 107 stores the type given as an argument to use this type (step S25). After that, the process by the FTP server 107 returns to step S23.

Since the FTP server 107 of the present embodiment does not support the command other than "QUIT", "STOR", and "TYPE", when receiving a command other than the above commands, the FTP server 107 returns a code number "502" indicating "command not-provided" to the image reading apparatus 108 (step S26). After that, the process by the FTP server 107 returns to step S23.

As described above, when the process for the command other than "QUIT" is completed, the process by the FTP server 107 returns again to step S23 to receive the command. Since the FTP server 107 is not provided with the commands of "LIST" and "RETR", the image reading apparatus 108 on the LAN 101 can not, through the FTP server 107, obtain the list of the file on the document managing server 102, and receive the file. As described above, in the present embodiment, the general-purpose file transfer protocol (FTP) provides only the authenticating function and the receiving function for receiving the document.

Figure 10:
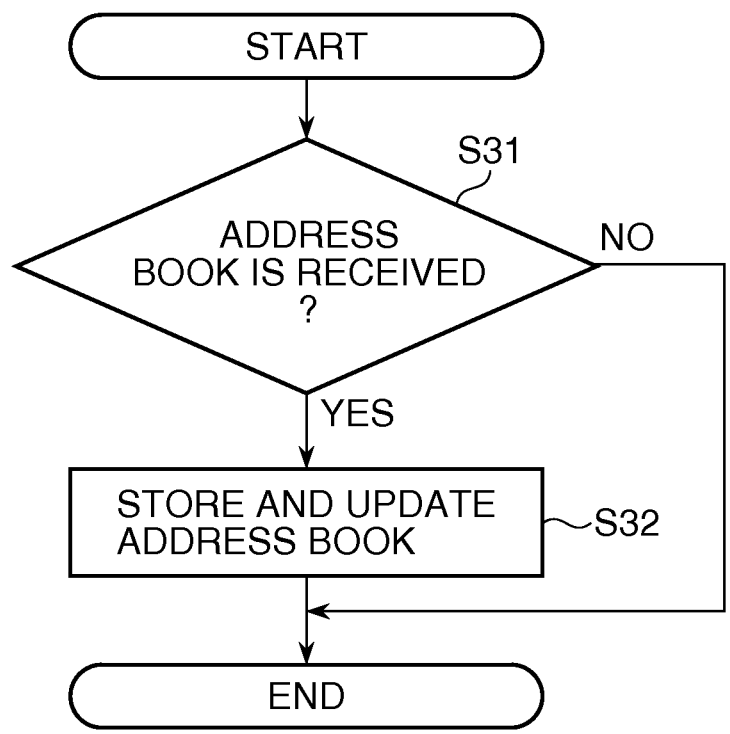
FIG. 10 is a flowchart showing a receiving procedure for the address book in the image reading apparatus.

FIG. 10 is a flowchart showing a receiving procedure for the address book in the image reading apparatus. The program for processing this procedure is stored in the hard disk (HDD) 405 in the total control unit 410, and is periodically executed by the CPU 401.

The CPU 401 determines whether or not the address book 109 is received from the document managing server 102 through the network I/F 414 (step S31). When the address book 109 is not received, the CPU 401 directly completes the present process. On the other hand, when the address book 109 is received, the received address book 109 is stored in the hard disk (HDD) 405 (step S32). Here, the process for receiving the address book 109 in step S31 is one example of the process executed by a second receiving unit. When the address book 109 is previously stored in the hard disk (HDD) 405, the address book 109 is overwritten. After that, the CPU 401 completes the present process.

Figure 11:
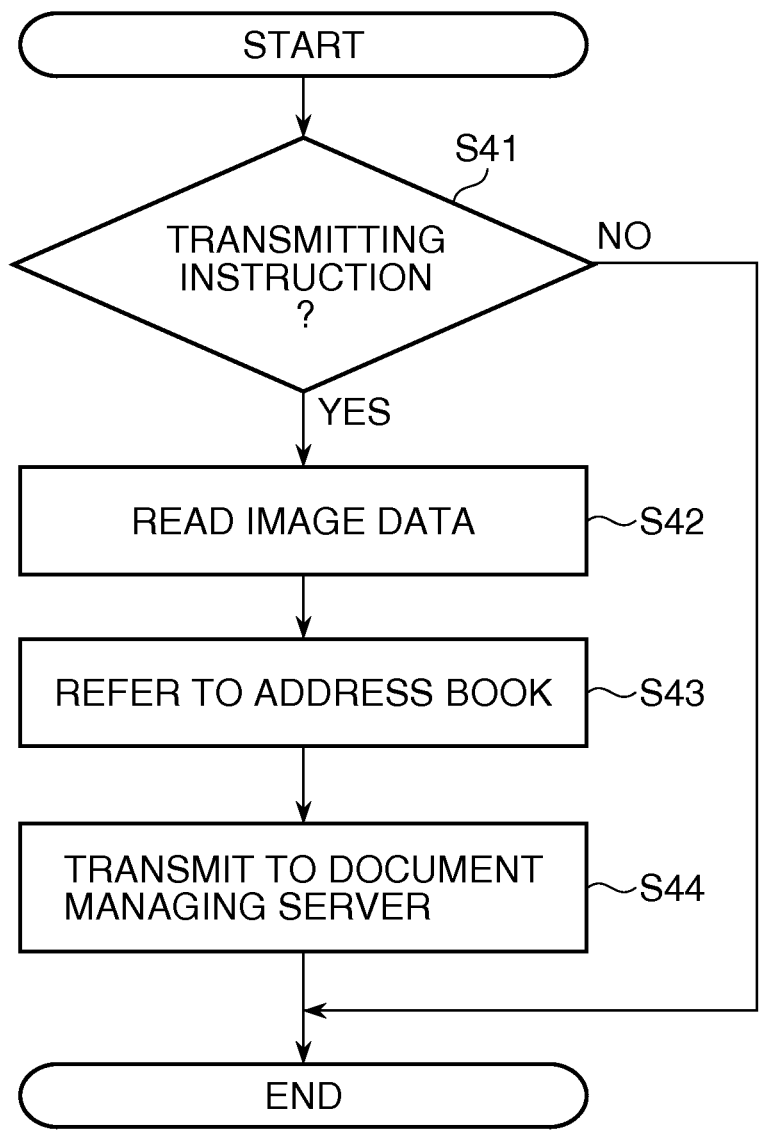
FIG. 11 is a flowchart showing a transmitting procedure for image data in the image reading apparatus.

FIG. 11 is a flowchart showing a transmitting procedure for the image data in the image reading device. The program for processing this procedure is stored in the hard disk (HDD) 405 in the total control unit 410, and is periodically executed by the CPU 401.

The CPU 401 determines whether or not a transmitting instruction is made by the user through the operation unit 413 (step S41). When the transmitting instruction is not issued, the CPU 401 directly completes the present process. On the other hand, when the transmitting instruction is issued, the CPU 401 reads the image data with the reader unit 411, and stores the read image data in the hard disk (HDD) 405 (step S42). The CPU 401 refers to the address book 109 stored in the hard disk (HDD) 405 (step S43). The CPU 401 issues the connection request to the FTP server 107 in the document managing server 102 which is the transmission destination described in the address book 109, and when the connection request is permitted, the CPU 401 transmits the image data (step S44). When the connection request is not permitted in step S44, the CPU 401 does not transmit the image data. After that, the CPU 401 completes the present process.

As described above, in the document managing system of the first embodiment, the document managing server 102 incorporates the FTP server 107. The FTP authentication information 106 of the FTP server 107 is automatically generated from the random numbers to have one-to-one correspondence with the authentication information 104 of the document managing server 102, and is stored in association with the user. The address book 109 simultaneously and automatically generated, including the FTP authentication information 106 is delivered to the image reading apparatus 108. When receiving the image data as a document from the image reading apparatus 108, the FTP server 107 uses the authentication information of the automatically-generated address book 109. When the authentication succeeds, the document managing server 102 associates the document with the user of the document managing server 102 associated with this authentication information and stores the document. Thus, data can be easily and safely transmitted from the image reading apparatus 108 to the document managing server 102.

In the document managing server 102, a data receiving function and a data managing function are integrated, so that the confidentiality of the document managing server 102 can be improved, and the convenience for a manager and the user is improved. The FTP authentication information 106 for the document managing server 102 to receive the image data, and the authentication information 104 of the document managing server 102 can be separated, so that the confidentiality of the authentication information 104 of the document managing server 102 can be improved. Because the address book 109 which is automatically generated by the document managing server 102 is delivered, the address book 109 in the image reading apparatus 108 is automatically generated, so that the convenience for the manager and the user is improved.

By comparing the authentication information included in the address book 109 with the FTP authentication information 106 kept in the document managing server 102, the authentication can be easily executed. Since the authentication information included in the address book 109 and the FTP authentication information 106 can be generated with the random numbers, security can be improved. Since the general-purpose file transfer protocol is used, data can be easily received. Since the address book 109 is periodically delivered, the address book 109 in the image reading apparatus 108 can be caused to be the newest.

[Second Embodiment]

The document managing system of the second embodiment is different from that of the above first embodiment in that the network address of the image reading apparatus is included in the FTP authentication information of the document managing server. Thus, the document managing system of the second embodiment is different from that of the first embodiment in that the FTP server of the document managing server uses the network address of the host computer for the user authentication in addition to the FTP user name and the FTP password. Other basic configuration of the second embodiment is the same as that of the first embodiment, so that the same figures and codes as those of the first embodiment are directly used in the same parts.

Figure 12:
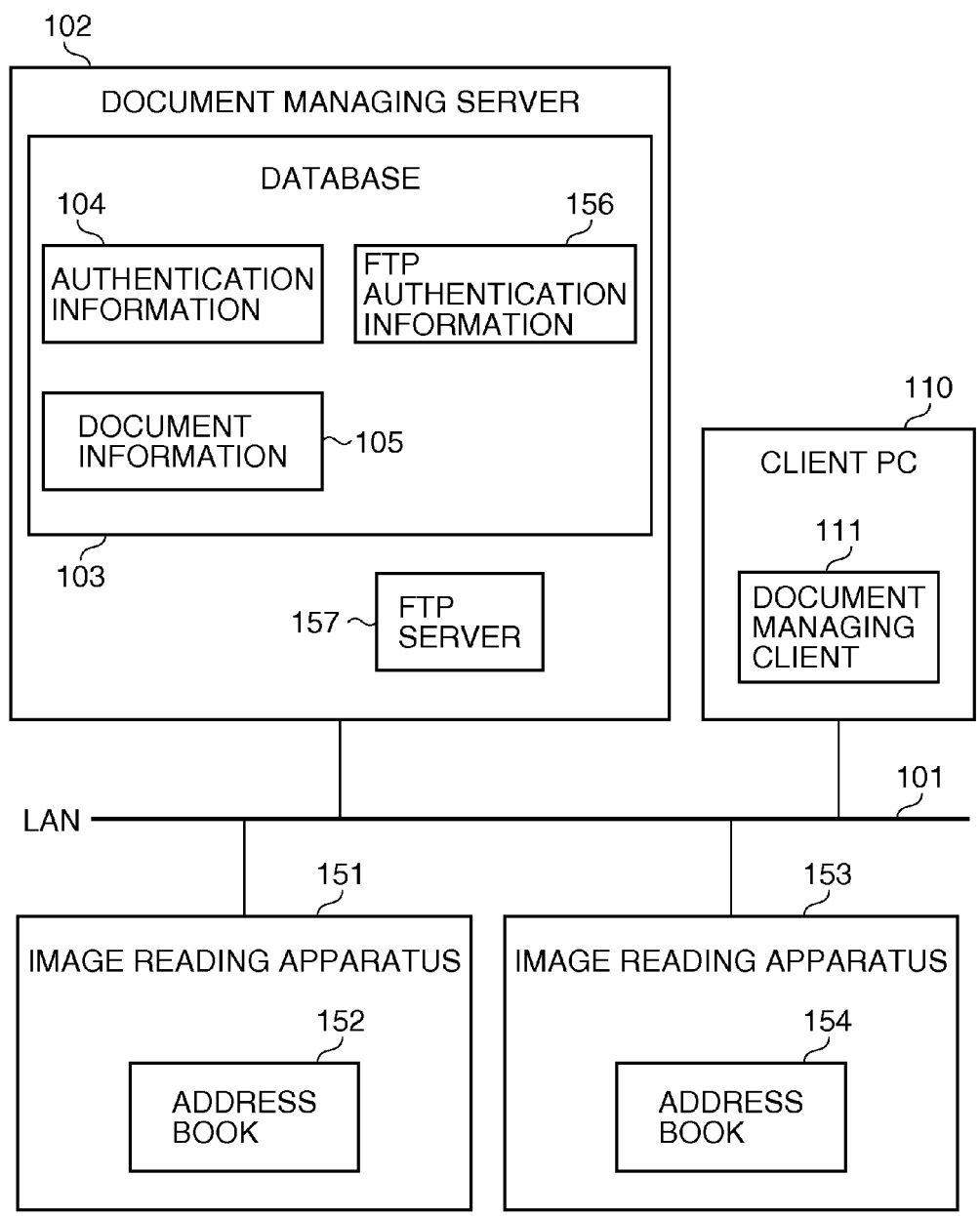
FIG. 12 is a block diagram showing a configuration of the document managing system according to a second embodiment of the present invention.

FIG. 12 is a block diagram showing a configuration of the document managing system according to the second embodiment. As described above, the document managing server 102 of the second embodiment includes a FTP authentication information 156 and a FTP server 157 which are different from those of the first embodiment. In the second embodiment, to clarify the difference from the first embodiment, two image reading apparatuses 151 and 153 are connected to the document managing server 102 through the LAN 101. The two image reading apparatuses 151 and 153 keep address books 152 and 154 which are separately and automatically generated, respectively.

Figure 13:
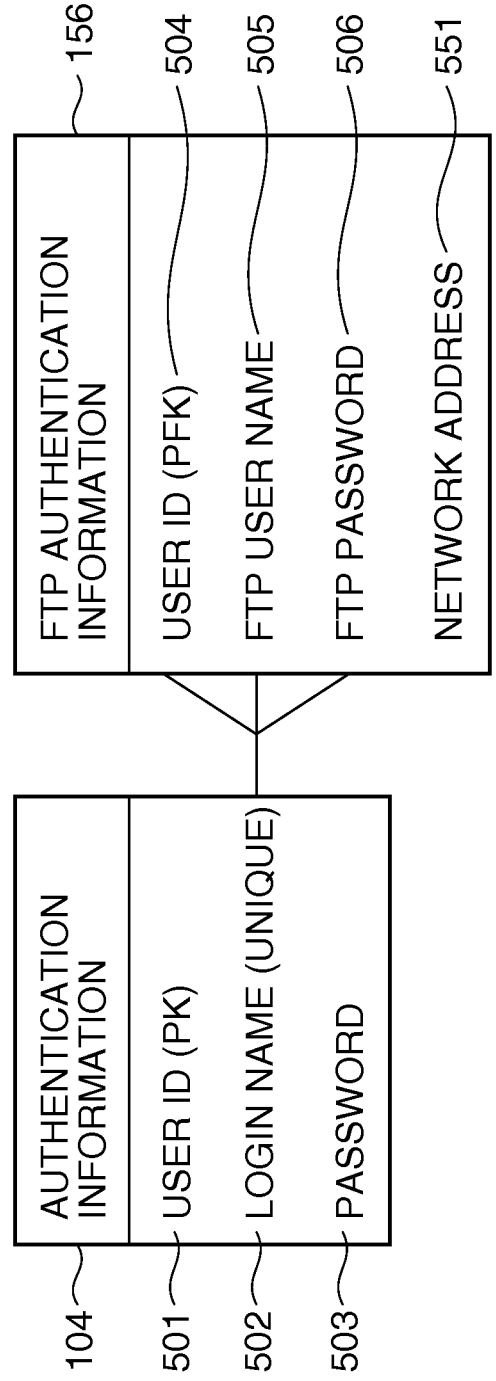
FIG. 13 is an ER diagram showing relation between the authentication information and the FTP authentication information.

FIG. 13 is an ER diagram showing relation between the authentication information and the FTP authentication information. Added to the FTP authentication information 156 is the network address (host address) 551 of the image reading apparatus 151 or 153, to which the address book including information [the FTP user name 505 and the FTP password 506] on the record is delivered. In this case, a combination of [the FTP user name 505 and the network address 551] of the FTP authentication information 156 becomes unique. The FTP authentication information 156 is stored in the external storage device 311.

Figure 14:
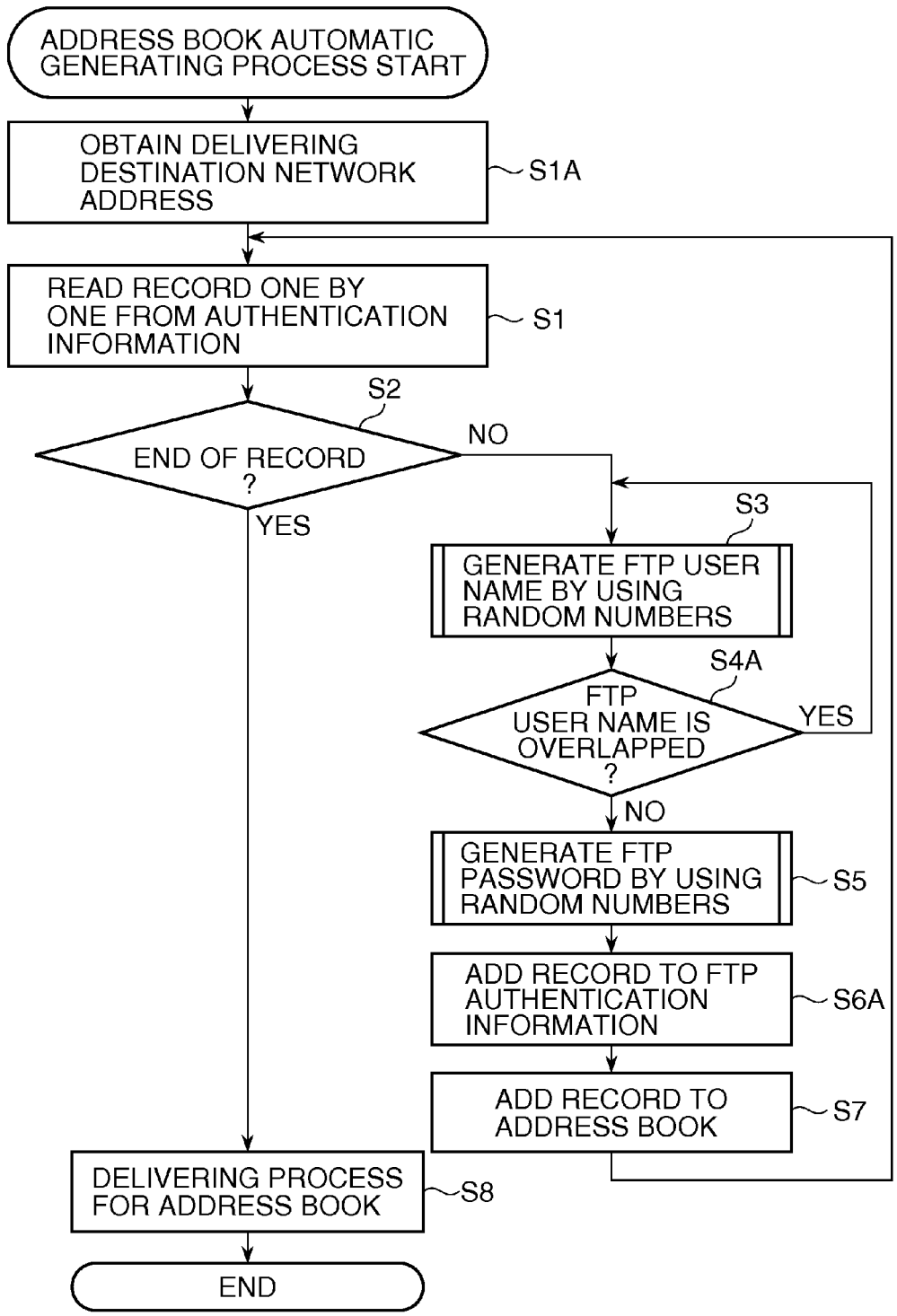
FIG. 14 is a flowchart showing an address book automatic generating procedure in the document managing system according to the second embodiment.

FIG. 14 is a flowchart showing the address book automatic generating procedure in the document managing system according to the second embodiment. The program for processing this procedure is stored in the external storage device 311 in the host computer 301 functioning as the document managing server 102, and is read to be executed by the CPU 302. Since the same step number is attached to the same step process as that of the first embodiment, the description will be omitted.

When the address book automatic generating process is started, the CPU 302 in the document managing server 102 obtains the network address of the image reading apparatus (151 or 153) to which the address book (152 or 154) to be generated is delivered (step S1A). Here, the network address of each of the image reading apparatuses 151 and 153 which are delivering destinations, is registered in the external storage device 311.

When the FTP user name is generated in step S3, the CPU 302 in the document managing server 102 checks the duplication of the generated FTP user name (step S4A). In this checking for the duplication of the FTP user name, it is confirmed whether or not a combination of [the generated FTP user name and the network address of the image reading apparatus to which the address book is delivered] exists in the FTP authentication information 156. When the same combination exists in the FTP authentication information 156, the CPU 302 in the document managing server 102 makes the process return to step S3, and executes the generating process for the FTP user name again.

When the FTP password is generated in step S5, the CPU 302 adds, to the FTP authentication information 156, a set of [the generated FTP user name, the generated FTP password, and the network address of the image reading apparatus to which the address book is delivered] (step S6A). The process for adding the network address of the image reading apparatus (151 or 153) to which the address book is delivered to the FTP authentication information 156 stored in the external storage device 311 corresponds to an address storing process.

Figure 15:
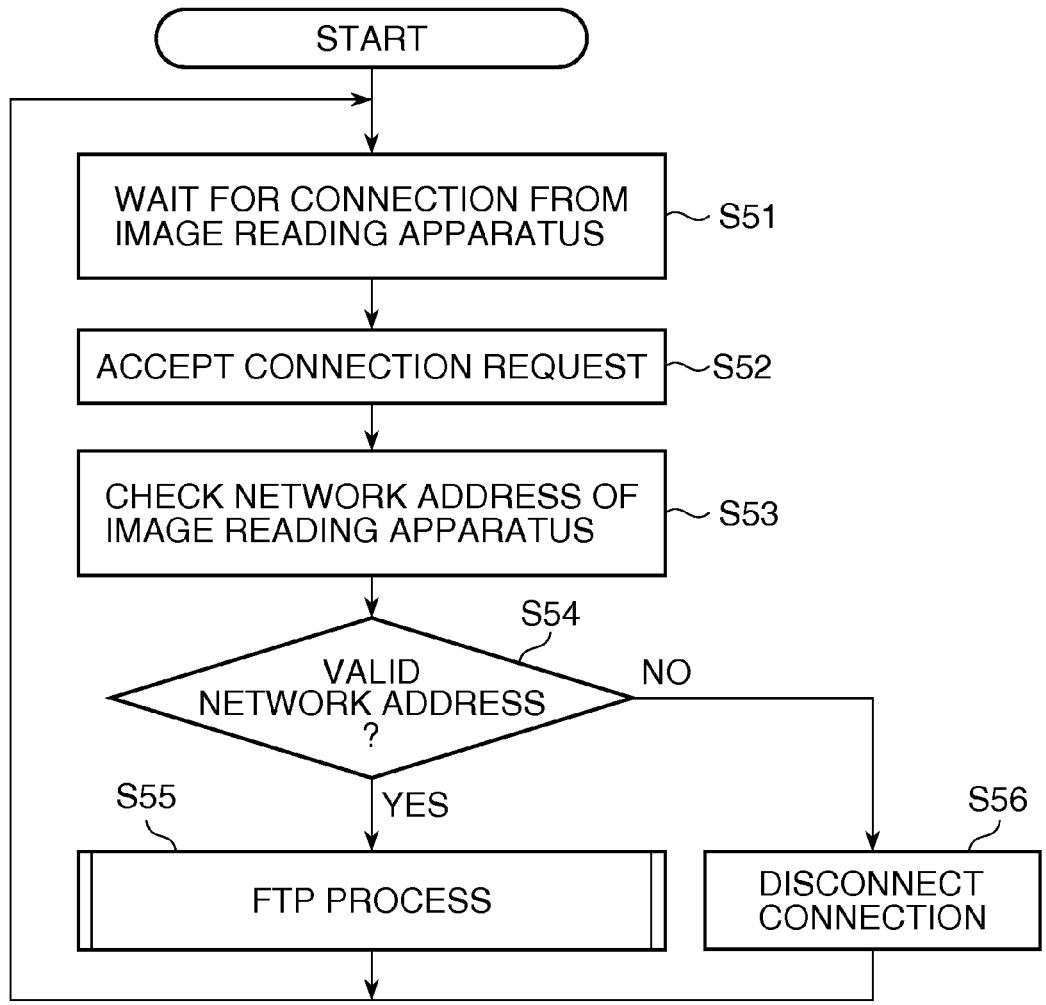
FIG. 15 is a flowchart showing a procedure when the FTP server receives a connection request from the host computer on a LAN.

FIG. 15 is a flowchart showing a procedure when the FTP server received the connection request from the image reading apparatuses on the LAN. The program for processing this procedure is stored in the external storage device 311 in the host computer 301 functioning as the FTP server 157 in the document managing server 102, and is read to be executed by the CPU 302.

When the process is started, the FTP server 157 waits until the connection request is issued by the image reading apparatus (151 or 153) on the LAN 101 (step S51). When the connection request is issued by the image reading apparatus (151 or 153) on the LAN 101, the FTP server 157 accepts this connection request (step S52). The FTP server 157 checks the network address of the image reading apparatus (151 or 153) which has issued the connection request (step S53). In this verification, it is checked whether or not the network address of the image reading apparatus (151 or 153) which has issued the connection request corresponds to any of the network addresses in the FTP authentication information 156.

As a result of the verification, when the network address of the image reading apparatus (151 or 153) is not found, the FTP server 157 disconnects the connection with the image reading apparatus (151 or 153) (step S56). After that, the process by the FTP server 157 returns to the connection waiting state of step S51.

On the other hand, when the network address of the image reading apparatus (151 or 153) is found in the FTP authentication information 156 in step S54, the same FTP process as that of FIG. 9 is started to be executed (step S55). The FTP process of the present embodiment is the same as that of the first embodiment other than that the authentication checking for the user authentication is executed under the match of [the FTP user name, the FTP password, and the network address of the image reading apparatus]. After that, the process by the FTP server 157 returns to the connection waiting state of step S51.

As described above, in the document managing system of the second embodiment, the document managing server 102 uses, in an authenticating process of the document receiving function, the network address of the image reading apparatus 151 or 153 to which the address book 152 or 154 is delivered. When the network address of the image reading apparatus 151 or 153 which transmits the image data does not correspond to the network address kept in the document managing server 102, the document managing server 102 does not receive the image data. Thus, as long as a third party obtaining the authentication information in the address book 152 or 154 does not fake the network address, the image data is prevented from being illegally transmitted from the image reading apparatus 151 or 153 on the LAN 101 to the document managing server 102.

[Third Embodiment]

In the document managing system of the third embodiment, when the address book is automatically generated, the following process is added. In the process, the user can selects users of the document managing server, which are added to the address book. Since a basic configuration of the document managing system of the third embodiment is the same as that of the first and second embodiments, the same figure and number are used for the common part.

FIGS. 16A and 16B are diagrams showing a UI operation screen and a user selection screen of the address book automatic generating process in the third embodiment respectively. In a UI operation screen 801 shown in FIG. 16A, the image reading apparatus to which the address book is delivered is selected. The followings are displayed in the UI operation screen 801: an image reading apparatus list 802; Next > button 803; and Cancel button 804.

The image reading apparatus list 802 is a list of the image reading apparatuses on the LAN 101. Here, the document managing server 102 keeps the list of the image reading apparatuses on the LAN 101 by searching the image reading apparatuses connected to the LAN 101, or because of the manual input by the user. The image reading apparatus list 802 is stored in the external storage device 311.

After the user selects the desired image reading apparatus from the image reading apparatus list 802, when the Next > button 803 is pressed, a user selection screen 805 shown in FIG. 16B is displayed. On the other hand, when the Cancel button 804 is pressed, the document managing server 102 stops the address book automatic generating process.

When the document managing server 102 does not keep the image reading apparatus list 802, such a configuration is available, in that the network address of the desired image reading apparatus is directly inputted.

When the Next > button 803 is pressed in the UI operation screen 801 of the document managing server 102, the document managing server 102 displays the user selection screen 805. The followings are displayed in the user selection screen 805: a user list 806; a < Back button 807; a Deliver button 808; and a Cancel button 809.

The user list 806 includes the authentication information 104 of the document managing server 102. The user selects from the user list 806 a user to be registered in the address book of the image reading apparatus selected in the UI operation screen 801. In an example of FIG. 16B, the two users of "Aoki" and "Itou" are selected.

When the < Back button 807 is pressed in this screen, the screen returns to the UI operation screen 801. When the Cancel button 809 is pressed, the document managing server 102 stops the address book automatic generating process. When the Deliver button 808 is pressed, the followings are generated: the network address of the selected image reading apparatus; the FTP authentication information including the user of the selected document managing server 102; and the address book. The generated address book is delivered to the image reading apparatus selected in the UI operation screen 801 of the document managing server 102.

As described above, the document managing system of the third embodiment includes a function for designating the user included in the address book delivered to the specific image reading apparatus. Thereby, for example, when the image reading apparatus and the user, which are located across multiple sections, are managed by the document managing server 102, only the user belonging to the designated section can be registered in the address book to be delivered for the image reading apparatus utilized by the designated section. Thus, it becomes possible to register only the user using the image reading apparatus in the address book, and a selection area is narrowed when the user selects the designated user from the address book, so that the convenience is improved.

The present invention is not limited to the configurations of the above embodiments, and can be applied to any configuration, in which the functions described in the scope of the claims, or the functions included in the configurations of the present embodiments can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-128317 filed May 15, 2008, which is hereby incorporated by reference herein in its entirety.

What is claimed is:

1. An information processing apparatus comprising:
   a registering unit adapted to register first authentication information required to allow a user to access data registered in the information processing apparatus when a first user authentication is executed;
   a generating unit adapted to generate second authentication information required to allow data transmission from an external apparatus to the information processing apparatus when a second user authentication is executed, the second authentication information different from the first authentication information;
   a managing unit adapted to manage the first authentication information registered in said registering unit in association with the second authentication information generated by said generating unit;
   a transmitting unit adapted to transmit the second authentication information generated by said generating unit to the external apparatus;
   an authenticating unit adapted to receive authentication information from the external apparatus, and perform the second user authentication by utilizing the received authentication information and the second authentication information; and
   a storing unit adapted to store, when said authenticating unit succeeds in the second user authentication, data transmitted from the external apparatus as data accessible through the first user authentication using the first authentication information managed in association with the second authentication by said managing unit.

2. The information processing apparatus according to claim 1,
   wherein said generating unit is adapted to generate address data used for transmitting the data from the external apparatus to the information processing apparatus.

3. The information processing apparatus according to claim 1, further comprising:
   a keeping unit adapted to keep the second authentication information generated by said generating unit,
   wherein said authenticating unit performs the second user authentication by comparing the second authentication information kept in said keeping unit with the authentication information received from the external apparatus.

4. The information processing apparatus according to claim 1,
   wherein said generating unit is adapted to generate the second authentication information with random numbers.

5. The information processing apparatus according to claim 1,
   wherein the data transmitted from the external apparatus is transmitted by using a general-purpose file transfer protocol.

6. The information processing apparatus according to claim 5,
   wherein the general-purpose file transfer protocol provides an authenticating function and a data-receiving function.

7. The information processing apparatus according to claim 1, further comprising:
   an address storing unit adapted to store an address of a device transmitting authentication information through a communication network,
   wherein a connection request is not accepted from a device without the address stored in said address storing unit.

8. The information processing apparatus according to claim 7,
   wherein said authenticating unit is adapted to keep a combination of the second authentication information and an address of the external apparatus as a transmission destination of authentication information in association with each other, and to succeed in the second user authentication when a combination of the authentication information received from the external apparatus and a provided address of the external apparatus matches the kept combination of the second authentication information and the address of the external apparatus.

9. The information processing apparatus according to claim 1,
   wherein said generating unit is adapted to periodically and automatically generate the second authentication information, and said transmitting unit is adapted to transmit the automatically-generated second authentication information.

10. The information processing apparatus according to claim 1,
    wherein the external apparatus comprises an image reading apparatus, and the data transmitted from the external apparatus comprises image data generated by the image reading apparatus reading an image of an original document.

11. A control method of controlling an information processing apparatus, comprising:
    a registering step of registering first authentication information required to allow a user to access data registered in the information processing apparatus when a first user authentication is executed;
    a generating step of generating second authentication information required to allow data transmission from an external apparatus to the information processing apparatus when a second user authentication is executed, the second authentication information different from the first authentication information;
    a managing step of managing the first authentication information registered in said registering step in association with the second authentication information generated in said generating step;

a transmitting step of transmitting the second authentication information generated in said generating step to the external apparatus;

an authenticating step of receiving authentication information from the external apparatus, and performing the second user authentication by utilizing the received authentication information and the second authentication information; and a storing step of storing, when the second user authentication performed in the authenticating step succeeds, data transmitted from the external apparatus as data accessible through the first user authentication using the first authentication information managed in association with the second authentication in said managing step.

12. A non-transitory computer-readable storage medium storing a program executable at least by a computer in an information processing apparatus, the program comprising:

a registering module adapted to register first authentication information required to allow a user to access data registered in the information processing apparatus when a first user authentication is executed;

a generating module adapted to generate second authentication information required to allow data transmission from an external apparatus to the information processing apparatus when a second user authentication is executed, the second authentication information different from the first authentication information;

a managing module adapted to manage the first authentication information registered according to said registering module in association with the second authentication information generated according to said generating module;

a transmitting module adapted to transmit the second authentication information generated according to said generating module to the external apparatus;

an authenticating module adapted to receive authentication information from the external apparatus, and perform the second user authentication by utilizing the received authentication information and the second authentication information; and a storing module adapted to store, when the second user authentication performed according to said authenticating module succeeds, data transmitted from the external apparatus as data accessible through the first user authentication using the first authentication information managed in association with the second authentication according to said managing module.

13. An information processing apparatus comprising:

a CPU; and a storage device connected to the CPU, at least one of the at least one storage device storing a program executable by the CPU, wherein the CPU is configured by the program at least to:

register first authentication information required to allow a user to access data registered in the information processing apparatus when a first user authentication is executed;

generate second authentication information required to allow data transmission from an external apparatus to the information processing apparatus when a second user authentication is executed, the second authentication information different from the first authentication information;

manage the first authentication information in association with the second authentication information;

instruct transmission of the second authentication information to the external apparatus;

receive authentication information from the external apparatus, and perform the second user authentication by utilizing the received authentication information and the second authentication information; and instruct storage of, when the second user authentication succeeds, data transmitted from the external apparatus as data accessible through the first user authentication using the first authentication information managed in association with the second authentication.

* * * * *